United States Patent [19]
Hagiwara

[11] Patent Number: 5,966,013
[45] Date of Patent: Oct. 12, 1999

[54] DETERMINATION OF HORIZONTAL RESISTIVITY OF FORMATIONS UTILIZING INDUCTION-TYPE LOGGING MEASUREMENTS IN DEVIATED BOREHOLE

[75] Inventor: Teruhiko Hagiwara, Houston, Tex.

[73] Assignee: Halliburton Energy Services, Inc., Houston, Tex.

[21] Appl. No.: 08/664,011

[22] Filed: Jun. 12, 1996

[51] Int. Cl.[6] .............................. G01V 3/18; G01V 1/40; G01V 3/38; G01V 3/28
[52] U.S. Cl. ......................... 324/339; 324/335; 364/422
[58] Field of Search .................................. 324/338, 339, 324/340, 341, 335; 364/422

[56] References Cited

U.S. PATENT DOCUMENTS 3,808,520  4/1974  Runge .................................... 324/343
5,329,448  7/1994  Rosthal .................................. 324/339

*Primary Examiner*—Walter E. Snow

[57] ABSTRACT

A method for determining horizontal resistivity of an anisotropic formation and a formation anisotropy response factor with an induction logging tool is claimed. The method utilizes two differing induction type measurements to determine the horizontal resistivity for the formation without knowledge of a borehole dip angle. The differing induction measurements may be different types of measurements or the same type of measurement made under differing operating conditions. The method further discloses a means for determining the vertical resistivity of an anisotropic formation based on the dip angle, the horizontal resistivity and the formation anisotropy response factor.

19 Claims, 14 Drawing Sheets

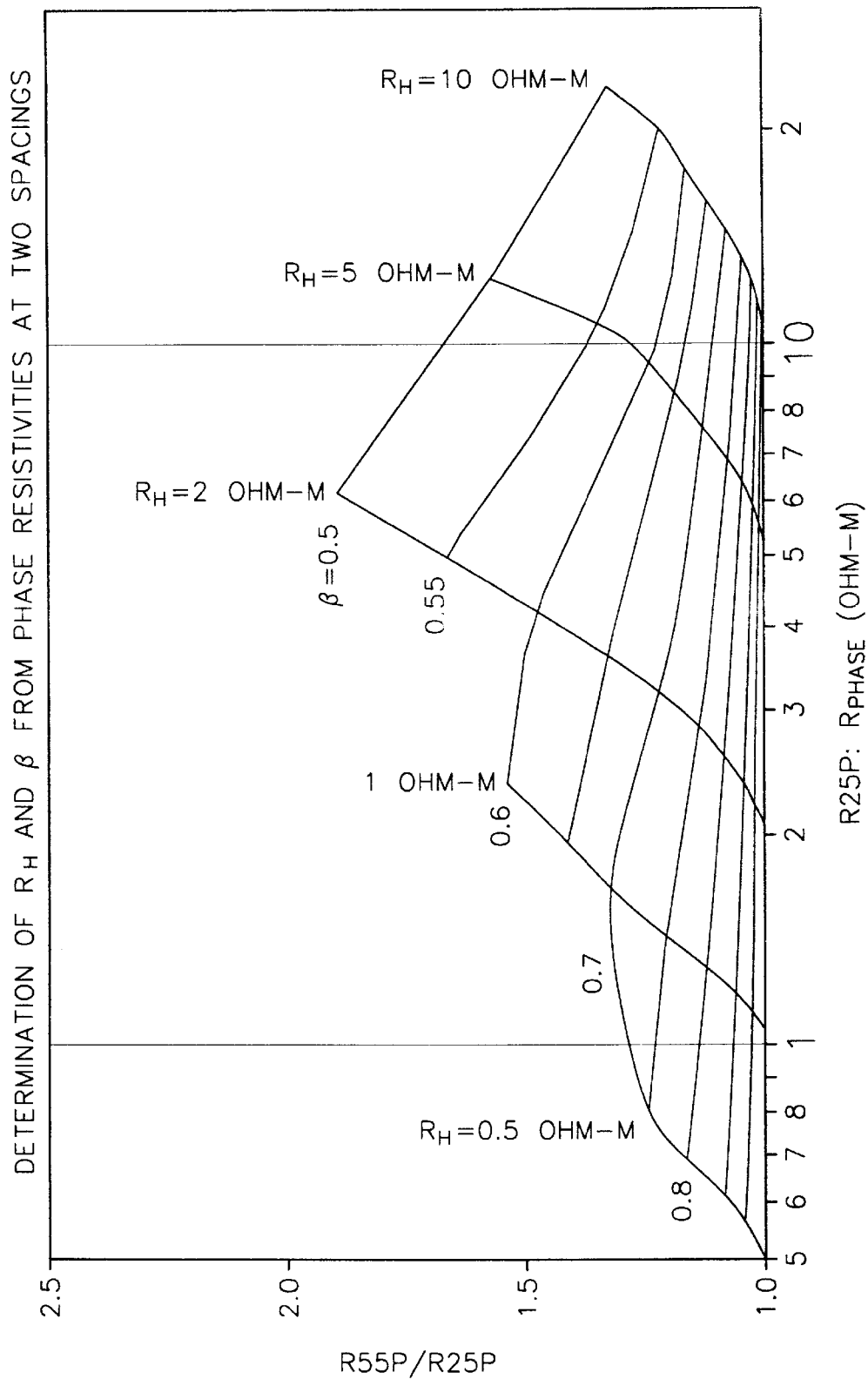

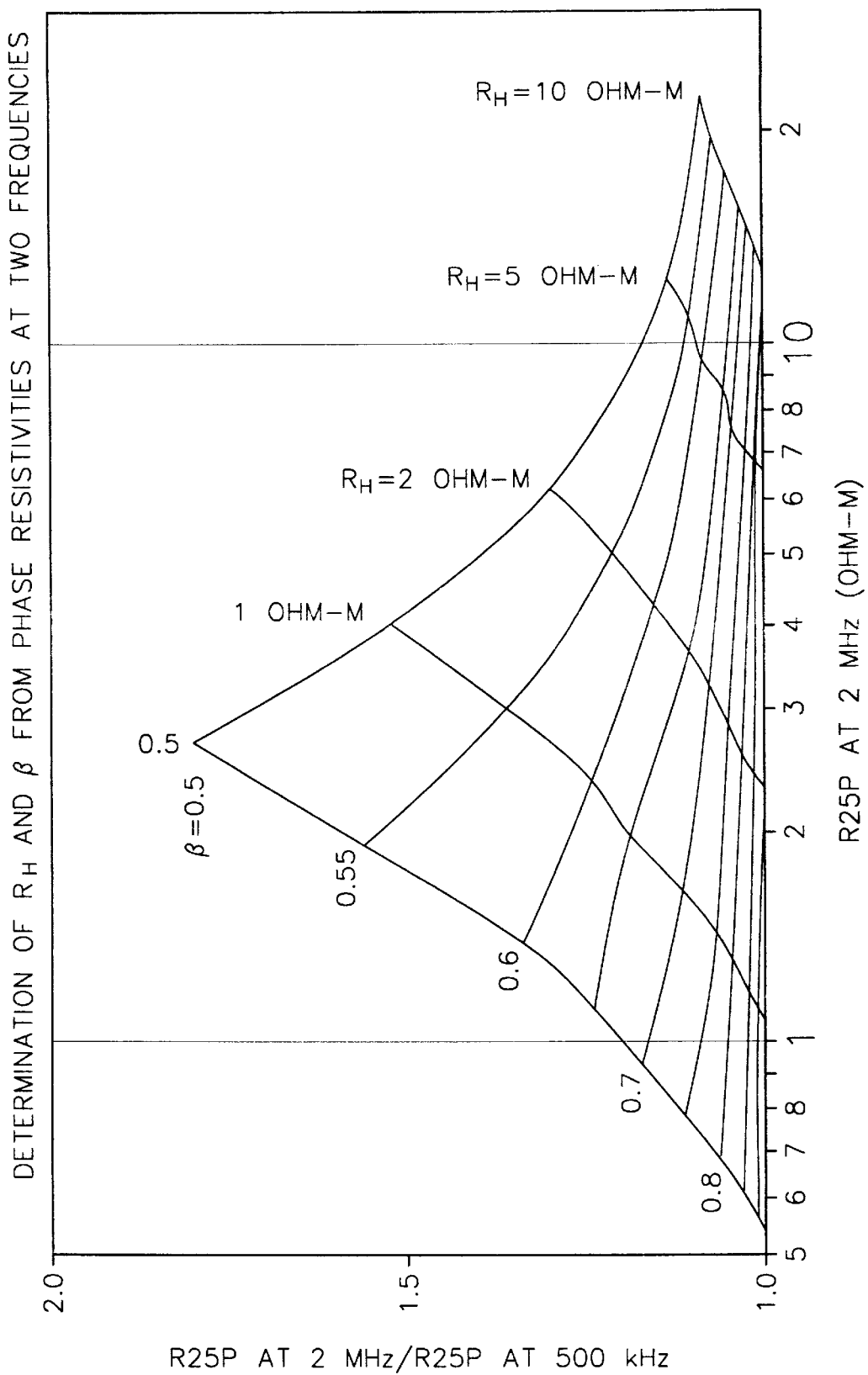

DETERMINATION OF HORIZONTAL RESISTIVITY OF FORMATIONS UTILIZING INDUCTION-TYPE LOGGING MEASUREMENTS IN DEVIATED BOREHOLE

BACKGROUND OF THE INVENTION

1. Field of the Invention

The present invention relates generally to the field of earth borehole logging, more particularly to a method for determining anisotropic properties of a subterranean formation surrounding an earth borehole without prior knowledge of the formation dip angle.

2. Statement of the Problem and Related Prior Art

It is well known that subterranean formations surrounding an earth borehole may be anisotropic with regard to the conduction of electrical currents. The phenomenon of electrical anisotropy is generally visualized in one of two ways, or a combination thereof, as follows.

In many sedimentary strata, electrical current flows more easily in a direction parallel to the bedding planes, as opposed to a direction perpendicular to the bedding planes. One reasons is that a great number of mineral crystals possess a flat or elongated shape (e.g., mica or kaolin). At the time they were laid down, they naturally took on an orientation parallel to the plane of sedimentation. The interstices in the formations are, therefore, generally parallel to the bedding plane, and the current is able to easily travel along these interstices which often contain electrically conductive mineralized water. Such electrical anisotropy, sometimes called microscopic anisotropy, is observed mostly in shales.

If a cylindrical sample is cut from a subterranean formation, parallel to the bedding planes, the resistivity of the sample measured with current flowing along its axis is called the transverse or horizontal resistivity $R_H$. The inverse of $R_H$ is the horizontal conductivity $\sigma_H$. If a similar cylinder is cut perpendicular to the bedding plane, the resistivity measured with a current flowing along its axis is called the longitudinal or vertical resistivity, $R_V$, and its inverse the vertical conductivity $\sigma_V$. The anisotropy coefficient a is defined as follows:

$$\alpha = \sqrt{\frac{R_H}{R_V}} = \sqrt{\frac{\sigma_V}{\sigma_H}} \tag{1}$$

Subterranean formation are often made up of a series of relatively thin beds having different lithological characteristics and, therefore different resistivities. In well logging systems, the distances between the electrodes or antennas are great enough that the volume involved in a measurement may include several such thin beds. When individual layers are neither delineated nor resolved by a logging tool, the tool responds to the formation as if it were a macroscopically anisotropic formation. A thinly laminated sand/shale sequence is a particularly important example of a macroscopically anisotropic formation.

In situations where the borehole intersects the formation substantially perpendicular to the bedding planes, conventional induction and propagation well logging tools are sensitive almost exclusively to the horizontal component of the formation resistivity. When the borehole intersects the bedding planes at an angle, a so-called deviated borehole, the tool readings contain an influence from the vertical and horizontal resistivities. This is particularly true when the angle between the borehole and the normal to the bedding places is large, such as in directional or horizontal drilling, where angles near 90° are commonly encountered. In these situations, the influence of vertical resistivity can cause discrepancies between measurements taken in the same formation in nearby vertical wells, thereby preventing a useful comparison of these measurements. In addition, since reservoir evaluation is typically based on data obtained from vertical wells, the use of data from wells drilled at high angles may produce erroneous estimates of formation producibility if proper account is not taken of the anisotropy effect.

There have been proposed a number of methods to determine vertical and horizontal resistivity using available resistivity measurements. At least two resistivity measurements are required. These methods include utilizing resistivity data from two different types of resistivity devices, such as electric logs and induction logs for a single well (Chemali, R. et al. "The Effect of Shale Anisotropy of Focused Resistivity Devices" 28th Annual Logging Symposium, Society of Professional Well Log Analyst. (SPWLA) Jun. 29–Jul. 2, 1987); induction log or electric log data at two different dip angles (Hagiwara, T. "Macroscopic Anisotropy Model: Analysis of Thinly Laminated Sand/Shale Binary Formations" Third Annual Archie Conference, October 1992); R signal resistivity and X signal resistivity from induction type logs at high dip angles (Moran, J. H. et al. "Effects of Formation Anisotropy on Resistivity Measurements", Geophysics, Vol. 4, pp, 1266–86, 1978; LWD phase resistivity or attenuation resistivities at high dip angles (Anderson, B. et al., "Response of 2 MHz LWD Resistivity and Wireline Induction Tools in Dipping Beds and Laminated Formations", 31st Annual Logging Symposium, SPWLA, Jun. 24–27, 1990); LWD phase or attenuation resistivities from two different spacings at a high dip angle (Rodney, P. et al. "The Effect of Rock Anisotropy on MWD Electromagnetic Wave Resistivity Tool", 35th Annual Logging Symposium, Jun. 19–22, 1994); and LWD phase or attenuation resistivities at two different frequencies at a high dip angle (Hagiwara, T., "Response of 2 MHz LWD Resistivity Devices in Thinly Laminated Formations (Anisotropic Resistivity and EM Log Interpretation)", SPE 28426, Society of Petroleum Engineers 69th Annual Technical Conference, Sept. 25–28, 1994). These methods require knowledge of the dip angle to determine formation anisotropy. The dip angle may be determined from direct formation measurement or may be estimated. This can present a problem in that it is not always possible to estimate the dip angle, particularly when the borehole is deviated and the formations are tilted at the same time, as error in the effective dip angle will result in an error in the resistivity estimate.

Equipment and techniques that determine horizontal and vertical conductivity or anisotropy by employing special equipment dedicated specifically to such purpose result in increased equipment cost and increased logging time and/or cost.

The present invention is directed to overcoming one or more of the problems set forth above by providing a new method for determining the certain anisotropic properties of subterranean formations. Moreover, the present provides for a determination of formation horizontal resistivity without information relating to the angle of the borehole relative to the formation, known as the dip angle.

SUMMARY OF THE INVENTION

A new method is provided for determining the anisotropic properties of subterranean formations, specifically the horizontal resistivity $R_H$, without knowledge of the dip angle.

In accordance with one aspect of the present invention, there is provided a method for determining the horizontal resistivity without knowing the required formation dip angle utilizing the induction type log measurements. In this method, the tool is calibrated to determine a proportionality constant. The proportionality constant, sometimes known as a sensitivity factor, is a function of the transmitter receiver spacing, the number of turns on the transmitter coil, the number of turns on the receiver coil, radius of the coils, and the operating frequency, and is well known in the art. See, Moran, J, et al. "Basic Theory of Induction Logging and Application to Study of Two-Coil Sondes" 28th Annual SEG Meeting, Oct. 14, 1958. Practice has demonstrated that this empirical relationship does not always hold and that a calibration reading must be run to more precisely determine this factor. A predetermined relationship between any two induction type resistivity measurements, horizontal resistivity, vertical resistivity, the formation anisotropy coefficient, and anisotropy factor, which is a function of the formation anisotropy coefficient and the formation dip angle is generated and may be printed or stored in a programmable central processing unit. These induction type resistivity measurements may be a combination of induction log R and X resistivity measurements; the phase and attenuation derived resistivities from a 2 MHz LWD type induction log; the phase or attenuation resistivities from a 2 MHz LWD resistivity logs measured using two different transmitter-receiver pair spacings; the phase or attenuation resistivities from a 2 MHz induction-type resistivity log taken at two different frequencies; or an induction log resistivity and LWD induction-type log resistivity. During logging operations, the same two resistivity measurements are made and transmitted to the central processing unit. The central processing unit receives the measurements and derives the formation anisotropy response factor and the horizontal resistivity. Using these two measurements, the vertical resistivity can be derived from the horizontal resistivity and the formation dip angle, where known. Alternatively, the anisotropy response factor may be used to estimate the dip angle if the overall formation anisotropy is known.

BRIEF DESCRIPTION OF THE DRAWINGS

The present invention will be more fully understood from the following detailed description of the preferred embodiments, taken in conjunction with the following drawings, in which:

FIG. 7A is a typical graphical illustration of a typical exemplary relationship between a high frequency (2 MHz) phase derived resistivity for a first spacing $R_{25P}$, the ratio of the phase derived resistivity to the attenuation derived resistivity for the same spacing, $R_{25P}/R_{25A}$, the formation anisotropy factor $\beta$, and the horizontal resistivity $R_H$;

FIG. 8B is a typical graphical illustration of a typical exemplary relationship between a high frequency (2 MHz) phase derived resistivity for a first spacing $R_{25P}$, the ratio of the phase derived resistivity for a first spacing $R_{25P}$, to a phase derived resistivity for a second spacing $R_{25P}$, the formation anisotropy factor $\beta$, and the horizontal resistivity $R_H$;

FIG. 10B is a graphical illustration of a typical exemplary relationship between a first high frequency (2 MHz) phase derived resistivity for a first spacing $R_{25P\omega1}$, the ratio of the high frequency phase derived resistivity for a first spacing $R_{25P,\omega1}$ to a phase derived resistivity for a second lower frequency (0.5 MHz) for the first spacing $R_{25P,\omega2}$, the formation anisotropy factor $\beta$, and the horizontal resistivity $R_H$;

DETAILED DESCRIPTION OF PREFERRED EMBODIMENTS

Figure 1:
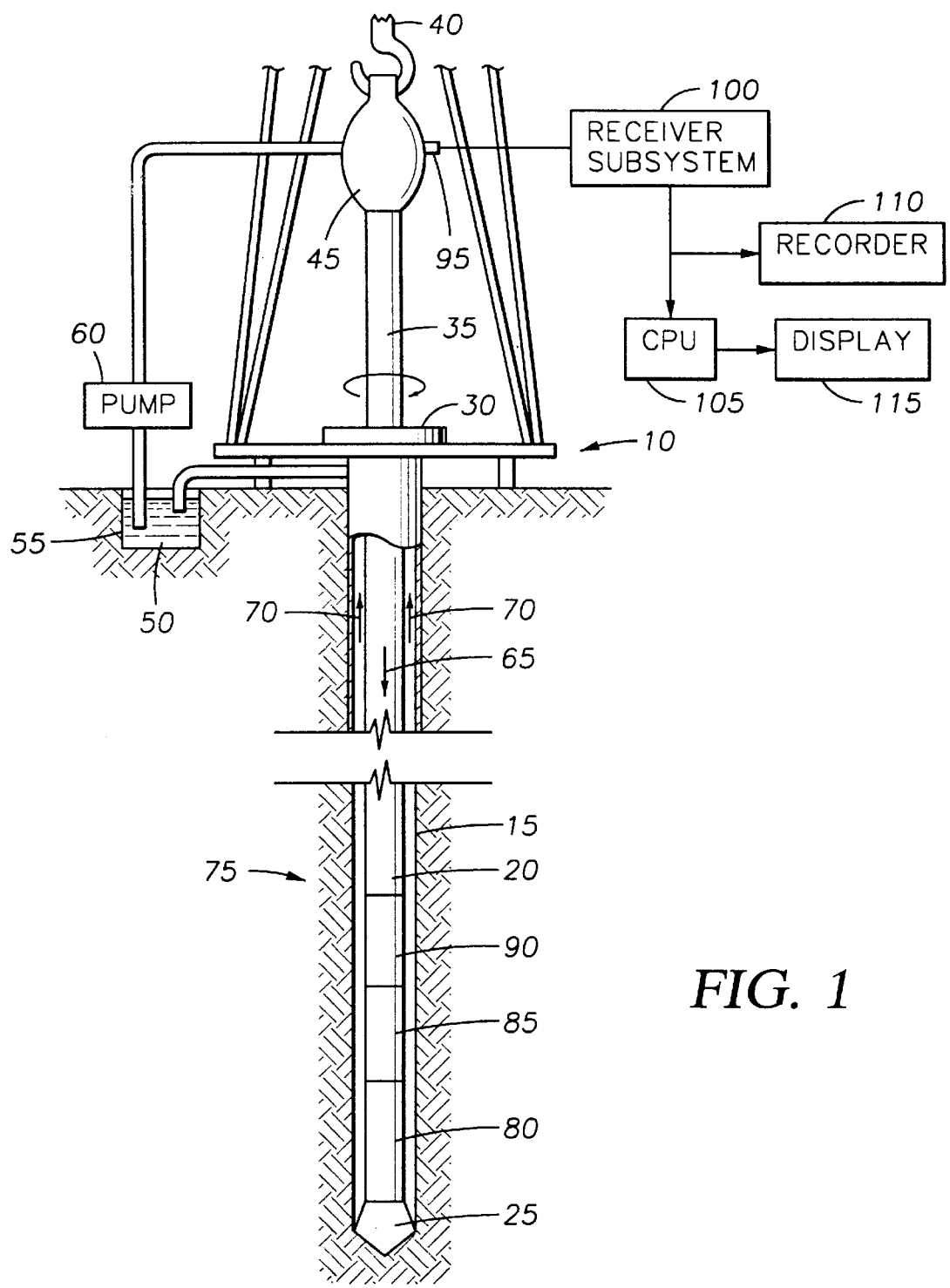
FIG. 1 is a schematic illustration in conjunction with a logging while drilling apparatus.

Turning now to the drawings and referring initially to FIG. 1, an embodiment of the present invention in conjunction with a logging-while-drilling (LWD) apparatus will now be described. A platform and derrick 10 are positioned over a deviated borehole 15 that is formed in the earth by rotary drilling (or equivalently a vertical borehole intersecting a dipping bed). A drill string 20 is suspended within the deviated borehole 15 and includes a drill bit 25 at its lower end. The drill string 20 and a drill bit 25 are rotated by a rotating table 30 which engages a kelly 35 at the upper end of the drill string 20. The drill string 20 is suspended from a hook 40 attached to a traveling block (not shown). The kelly 35 is connected to the hook 40 through a rotary swivel 45 which permits rotation of the drill string 20 relative to the hook 40. Alternatively, the drill string 20 and drill bit 25 may be rotated from the surface by a "top drive" type of drilling rig.

Drilling mud 50 is contained in a pit 55 in the earth. A pump 60 pumps the drilling my 50 into the drill string 20 via a port in the swivel 45 to flow downward through the center of the drill string 20, as indicated by the flow arrow 65. The drilling mud 50 exits the drill string 20 via ports in the drill bit 25 and then circulates upward in the region between the outside of the drill string 20 and the periphery of the deviated borehole 15, as indicated by the flow arrows 70. The drilling mud 50 thereby lubricates the bit 25 and carries formation cuttings to the surface of the earth. The drilling mud 50 is returned to the pit 55 for recirculation.

Mounted in conjunction with the drill bit 25 is a bottom hole assembly 75 that includes a directional drilling assembly 80 with a mud motor having a bent housing or an offset sub. Mounted above the directional drilling assembly 80 is an induction type logging tool 85. A measurement and communications subassembly 90 is also provided and includes means, known in the art, for measuring and computing the direction and inclination of the bottom hold assembly 75. The communications subassembly 90 may typically be a mud pulse telemetry system that includes a downhole transmitter for sending coded information, including measurement signals, uphole and surface instrumentation for detecting and decoding the information. One type of mud pulse telemetry system has an acoustic transmitter which employs a device known as a "mud siren" which includes a slotted stator and a slotted rotor that rotates and repeatedly interrupts the flow of drilling fluid to establish a desired acoustic wave signal in the drilling mud 50. Driving electronics in the communications subassembly 90 may typically include a suitable modulator, such as a phase shift keying (PSK) modulator, which conventionally produces driving signals for application to the mud transmitter. These driving signals can be used to apply appropriate modulation to the mud siren. The generated acoustic mud wave travels upward in the fluid through the center of the drill string at the speed of sound in the drilling mud 50. The acoustic wave is received at the surface of the earth by transducers 95. The transducers 95, which are, for example, piezoelectric transducers, convert the received acoustic signals to electronic signals. The output of the transducers 95 is coupled to the uphole receiving subsystem 100 that is operative to demodulate the transmitted signals, which can then be communicated to a programmed central processing unit (CPU) 105 and a recorder 110. The CPU 105 further communicates with a display unit 115. The programmed CPU 105 can be of any suitable type, for example a digital microprocessor, with associated memory, timing, input/ output, and display driver functions.

Figure 2:
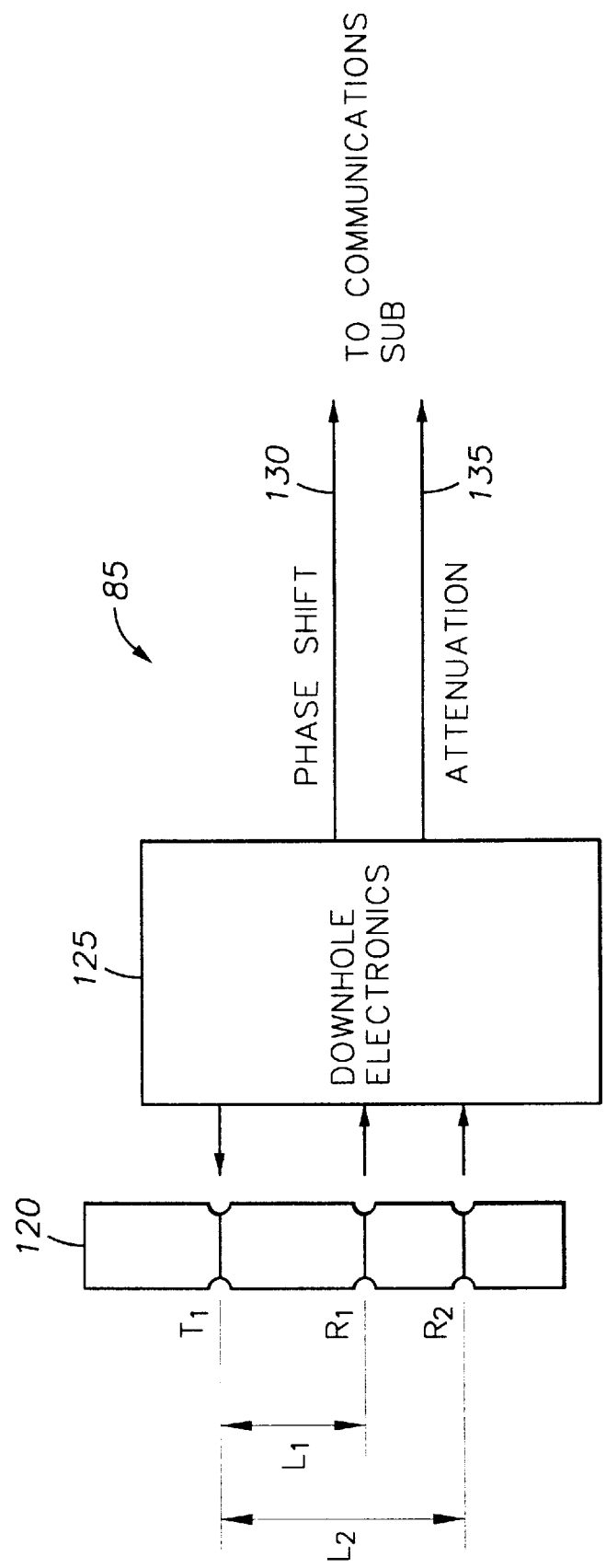
FIG. 2 is a schematic illustration of an induction type logging tool used in conjunction with the present invention.

Referring now to FIG. 2, the induction type logging tool 85 will now be described. The induction type logging tool 85, which is a conventional induction type logging tool, includes a transmitting antenna $T_1$, and a pair of receiving antennas $R_1$ and $R_2$ mounted on a section of a drill collar 120. The first receiving antenna $R_1$ is spaced from the transmitting antenna $T_1$ by a distance $L_1$, and the second receiving antenna $R_2$ is spaced apart from the transmitting antenna $T_1$ by a distance $L_2$. The antennas are coils supported in insulating media in recesses in the drill collar 120. The downhole electronics 125, typically contained in the drill collar 120, include means for energizing the transmitting antenna $T_1$ with a signal having a frequency in the range from 0.1 MHz to 10 MHz, and typically about 2 MHz. An electromagnetic field produced by the transmitting coil $T_1$ induces eddy currents which flow in the conductive subterranean formation in loops centered on the axis of the deviated borehole 15. The eddy currents generate secondary electromagnetic fields which induce voltages in the receiver coils $R_1$ and $R_2$. The induced voltages, $V_1$ and $V_2$, at the receiver pair are then measured, in a well known manner, in a so-called differential receiver arrangement, to obtain a phase shift signal ($\Phi$) 130 representative of a phase shift between the electric potentials of the receiver pair, and an attenuation signal (A) 135 representative of an attenuation between the electric potentials of the receiver pair. These signals are then communicated to the communications subassembly 90 for transmission to the surface of the earth, where they are received by the programmed CPU 105 for further processing.

While the induction type logging tool 85 may include additional transmitters and receivers, as is well known in the art, they are not necessary for the determination of the anisotropic properties of a subterranean formation. The use of a single transmitter $T_1$ and a pair of receivers $R_1$ and $R_2$ will permit the determination of the anisotropic properties of a subterranean formation. In a preferred embodiment, the induction type logging tool 85 will be a Compensated Wave resistivity (CWR) induction type logging tool, utilizing a single transmitter, and a pair of receivers, with multiple transmitter-receiver spacings, as available from Halliburton Energy Services of Houston, Tex.

The programmed CPU 105 then processes, in a well known manner by means of a lookup table stored in random access memory, the phase shift signal ($\Phi$) 130 and the attenuation signal (A) 135 to generate a phase shift derived resistivity signal $R_\Phi$ representative of a phase shift derived resistivity and an attenuation derived resistivity signal $R_A$ representative of an attenuation derived resistivity, respectively.

In an alternative embodiment, the programmed CPU 105 and associated memory, timing, and input/output functions may be positioned downhole, within the induction logging tool 85 itself, in a well known manner. In this alternative embodiment, the processed signals and resulting computational results are stored in the memory of the programmed CPU 105 for later retrieval at the surface location.

Figure 3:
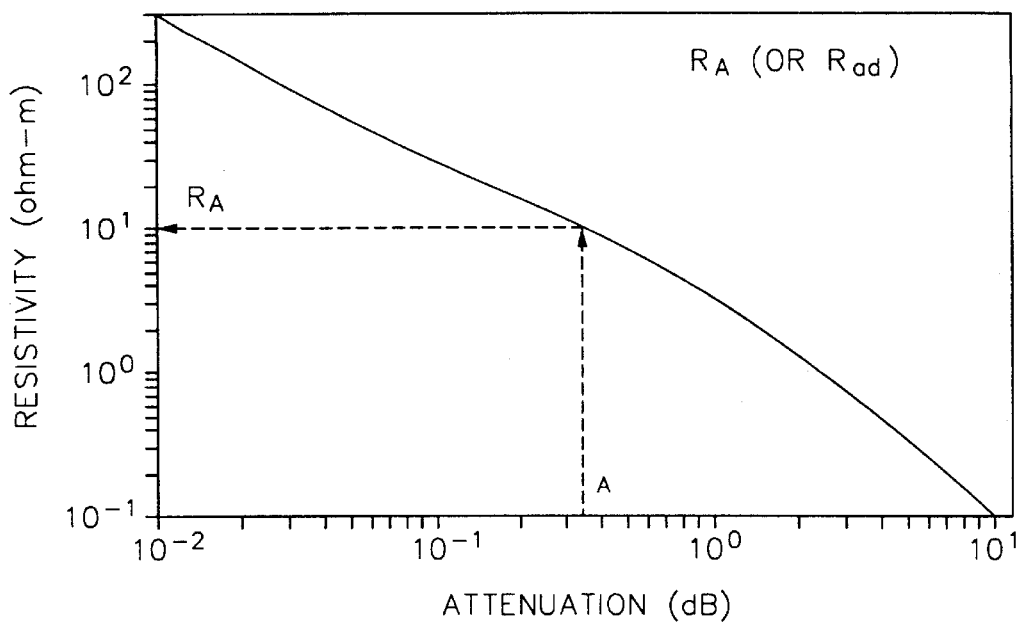
FIG. 3 is a graphical illustration of a typical relationship between an attenuation signal and an attenuation derived resistivity signal.
Figure 4:
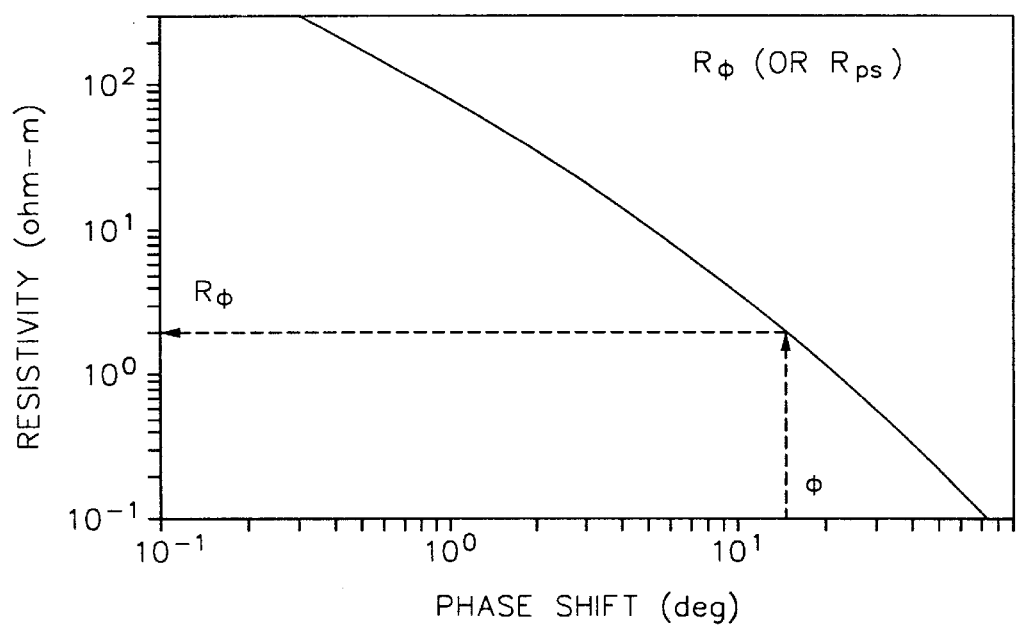
FIG. 4 is a graphical illustration of a typical relationship between a phase shift derived signal and a phased shift derived resistivity signal.

FIG. 3 represents a typical exemplary relationship between the attenuation signal (A) 135 and the attenuation derived resistivity signal $R_A$, while FIG. 4 represents a typical exemplary relationship between the phase shift signal ($\Phi$) 130 and the phase shift derived resistivity signal $R_\Phi$.

The illustrated exemplary relationships are for an embodiment with the receivers, $R_1$ and $R_2$, mounted on a 6.75 inch diameter drill collar, with receiver spacings of 20 and 30 inches, and a transmitter frequency of 2 MHz.

For the induction type logging tool 85, operating at frequencies above approximately 0.1 MHz, the voltage V induced in the receivers $R_1$ and $R_2$ is given by the following relationship:

$$V = \frac{i\tau}{L^3}(-2e^{ikL}(1-ikL) + ikL(e^{ikL\beta} - e^{ikL})) \qquad (2)$$

Where $$\beta = \sqrt{\cos^2\theta + \alpha^2\sin^2\theta}\text{; and} \qquad (3)$$

$$k^2 = \omega^2\mu(\varepsilon_h + i\sigma_h/\omega). \qquad (4)$$

Where:

$\tau$ represents a proportionality constant which is dependent upon the induction type logging tool 85 and is a function of the loop antenna radii and the operating frequency $\omega$ and is determined during an initial calibration of the induction type logging tool 85 in a known manner;

L represents the spacing utilized between the transmitters and receivers utilized in the induction type logging tool 85;

k represents the wave number;

$\mu$ represents the magnetic permeability for the subterranean formation;

$\theta$ represents the deviation of the deviated borehole 15 from the subterranean formation normal direction, often known as the dip angle (which would be present for a deviated borehole or a dipping bed);

$\alpha$ represents the anisotropy constant for the subterranean formation;

$\omega$ represents the operating frequency of the induction type logging tool 85;

$\sigma_H$ represents the horizontal conductivity for the subterranean formation; and $\varepsilon_H$ represents the horizontal dielectric constant for the subterranean formation.

The operating variables $\omega$, $L_1$, $L_2$, and $\theta$ can all be varied during a logging operation, with a variation in the deviation angle $\theta$ requiring two boreholes in the same formation. As a practical matter, the transmitter receiver spacing is not physically changed. The CWR tool has multiple transmitters and receiver coils, effectively allowing one to choose or change the spacing. Further, while two or more dip or deviation angles may be used where more than one borehole penetrates the formation, it is not an operating variable of the tool which may be readily changed. In a preferred embodiment, the operating frequency $\omega$ ranges from approximately 20 KHz to 2 MHz, the transmitter-receiver spacing $L_1$ ranges from approximately 10" to 50", the transmitter spacing $L_2$ ranges from approximately 20" to 60", and the dip angle $\theta$ ranges from approximately 0° to 90°.

Figure 5:
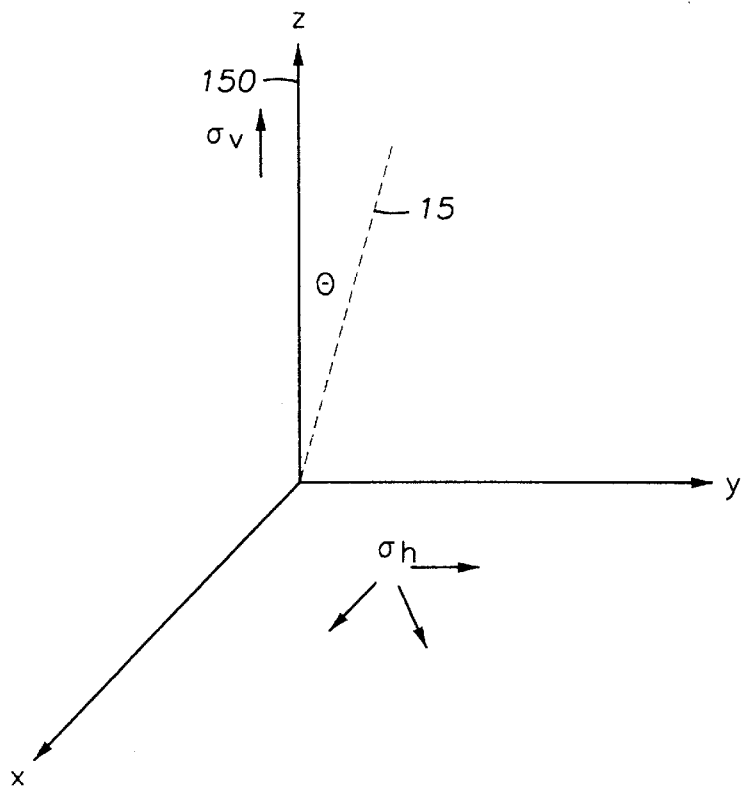
FIG. 5 is an illustration of the geometrical relationship between the horizontal and vertical resistivities.

FIG. 5 illustrates the geometrical relationship between the orientation of the borehole 15 and the normal 150 of the subterranean formation.

The phase shift signal ($\Phi$) 130 and the attenuation signal (A) 135 are then obtained for the induction type logging tool 85 by the following relationship:

$$A = \frac{\sqrt{V_{2,re}^2 + V_{2,im}^2}}{\sqrt{V_{1,re}^2 + V_{1,im}^2}} \text{ and } \Phi = \arctan\frac{V_{2,im}}{V_{2,re}} - \arctan\frac{V_{2,im}}{V_{1,re}} \qquad (5)$$

Where $V_1$, the voltage induced in the receiver $R_1$, consists of real and imaginary parts, $V_{1,re}$ and $V_{1,im}$, and $V_2$, the voltage induced in the receiver $R_2$, consists of real and imaginary parts, $V_{2,re}$ and $V_{2,im}$.

The relationships expressed in equations (2), (3), and (4) above for the induced voltage V, lead to the following observations. First, since the wave number k is a complex number, induction type logging tool responses are characterized by two measurements: phase and attenuation. Consequently, the effect of anisotropy depends on the magnitude of kL (the product of the wave number and transmitter-receiver spacing) explicitly. Therefore, the effect of anisotropy shows up differently for different transmitter-receiver coil spacings. Thirdly, with identical transmitter-receiver coil spacings, the anisotropy effect is different for different operating frequencies. Finally, with identical transmitter-receiver coil spacings, and for identical operating frequencies, the effect of anisotropy shows up differently for different deviation angles $\theta$.

The phase shift derived and attenuation derived resistivities should be identical in a thick, homogeneous, and isotropic formation. They will, however, be different in formations including shoulder beds, formations with fluid invasion, formations that are highly resistive and highly dielectric. They will also differ in a homogeneous but anisotropic formation.

The present invention permits the determination of the horizontal $R_H$ resistivity without knowledge of the dip angle $\theta$. Reviewing Equation 2, there are three parameters: k, the complex wave number in the horizontal direction, which is defined as a function of the horizontal formation conductivity $\sigma_H$, the horizontal dielectric constant $\varepsilon_H$, and the angular frequency $\omega$. The dielectric effect is generally negligible at lower frequencies and for low resistivity formations. In such instances:

$$\omega\varepsilon_H R_H << 1 \qquad (6)$$

The second parameter is L, the spacing between the transmitter and a receiver. The third factor is $\beta$, which is defined in Equation 3. Equation 2 suggests that it is possible to determine the wave number k and the anisotropy response factor $\beta$ simultaneously from any two induction-type logging measurements for a given transmitter-receiver spacing L at any deviation/dip angle. Knowledge of the dip/deviation angle is needed to solve for the anisotropy $\alpha^2 = \sigma_V/\sigma_H$, once $\beta$ is known. However, in many logging applications, only the horizontal conductivity $\sigma_H$ need be known. Further, $\sigma_H$ can be determined directly from the wave number k.

In one preferred embodiment, the induction log R ($R_R$) and X ($R_X$) resistivities may be used to determine aH without knowledge of the dip angle. Induction logs respond to the formation resistivity as follows:

$$R_R = \frac{R_H}{\sqrt{\cos^2\theta + \alpha^2\sin^2\theta}} = \frac{R_H}{\beta} \qquad (7)$$

Equation 7 is valid for low frequencies for deviated boreholes in homogeneous and anisotropic formation. Alternatively, the resistivity obtained from the induction X log signals in this type of formation is given as follows:

$$R_X = \frac{R_H}{\left(\frac{1+3\beta^2}{4}\right)^{2/3}} \qquad (8)$$

Figure 6:
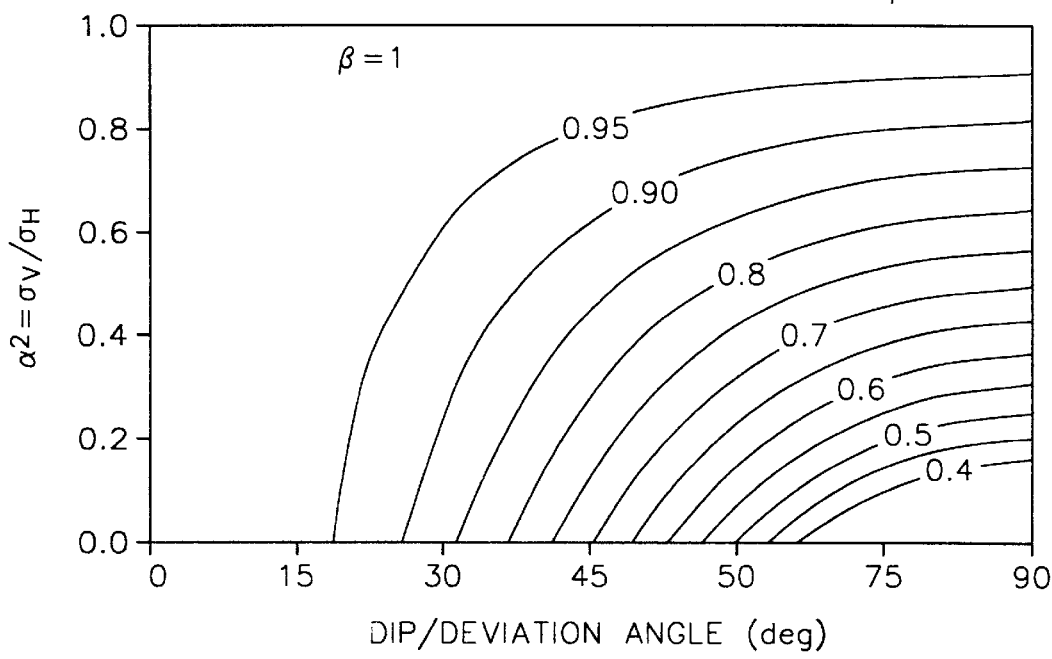
FIG. 6 is a graphical illustration of a typical exemplary relationship for a range of formation anisotropy factors $\beta$, dip angles $\theta$, and the formation anisotropy $\alpha^2$.

Thus, the horizontal resistivity $R_H$ and the anisotropy response factor $\beta$ may be calculated by simultaneous solution of Equations 7 and 8. One of ordinary skill in the art can create a nomograph, such as FIG. 5, which may be used to graphically determine β, the anisotropy response factor, based on the log R and log X values. The horizontal resistivity $R_H$ may then be easily obtained by inverting Equation 7 and solving $R_H=R_R\beta$. Alternatively, the simultaneous solution of Equations 7 and 8 for a range of $R_X$ and $R_R$ may be stored in a computerized lookup table. Equation 3 may then used to determine $\alpha^2$ or a look-up chart of the type illustrated in FIG. 6 may be used to determine the formation anisotropy $\alpha^2$ from the anisotropy response factor β if the dip angle θ is known.

Figure 7A:
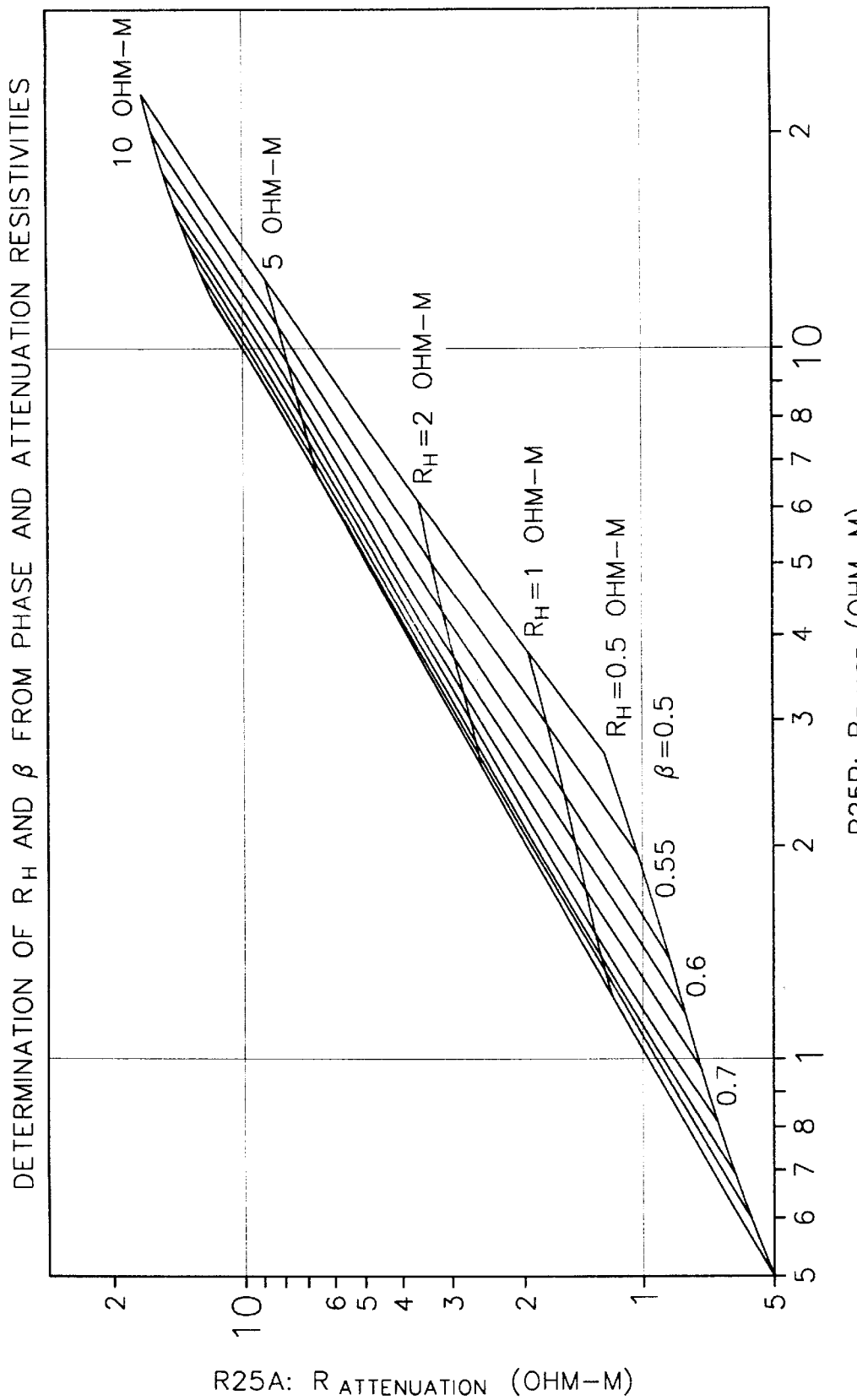
FIGS. 7A is a typical graphical illustration of a typical exemplary relationship between a high frequency (2 MHz) phase derived resistivity $R_P$, the attenuation derived resistivity $R_A$, the formation anisotropy factor $\beta$ and the horizontal resistivity $R_H$.
Figure 7B:
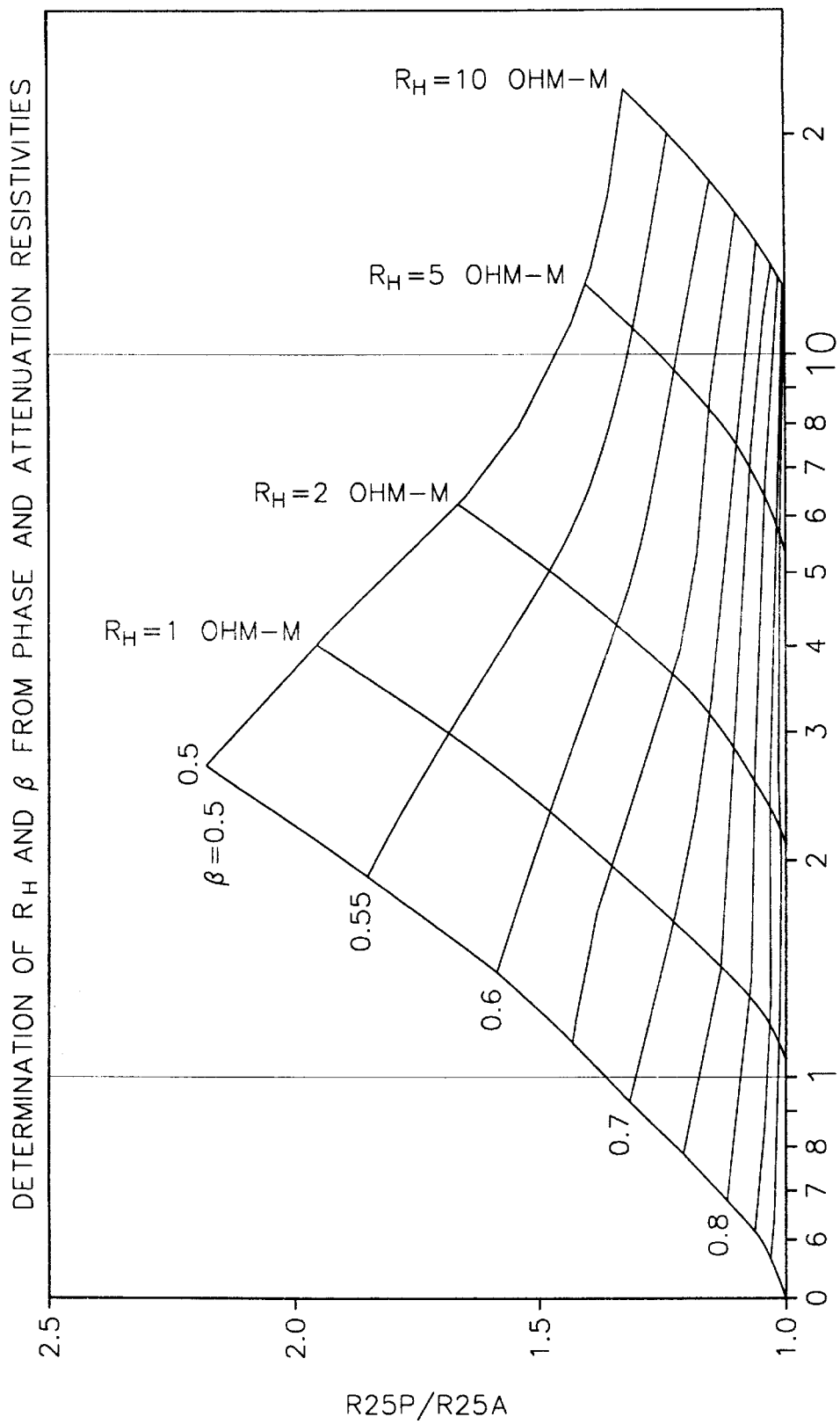

In another preferred embodiment, the horizontal resistivity $R_H$ may be determined utilizing the phase and attenuation resistivities of high frequency (2 MHz) LWD induction type logs. At higher frequencies, e.g., 2 MHz, where LWD induction type resistivity devices operate, the phase resistivity $R_P$ and the attenuation resistivity $R_A$ are used instead of $R_R$ and $R_X$. The phase resistivity and attenuation resistivity are determined utilizing an LWD induction type tool, such as the CWR, and Equation 5. The difference between the phase and the attenuation resistivities can be used to determine the horizontal resistivity and the anisotropy response factor β, by inverting Equation 2 and simultaneously solving it with Equation 4. Herein the spacing between the transmitter and receiver is known and the dielectric effect can again be considered constant. Using nomographs, such as those illustrated in FIG. 7A, or a lookup table, one knowing the transmitter-receiver spacing, and the phase resistivity $R_{25P}$ and attenuation resistivity $R_{25A}$, one may readily determine the horizontal resistivity $R_H$ and the formation anisotropy factor β. Alternatively, the phase resistivity $R_{25P}$ and the ratio of the phase resistivity to the attenuation resistivity, $R_{25P}/R_{25A}$, may be used to develop a nomograph, as in FIG. 7B, or a lookup table, from which the horizontal resistivity and the formation anisotropy factor β may be readily determined.

Figure 8A:
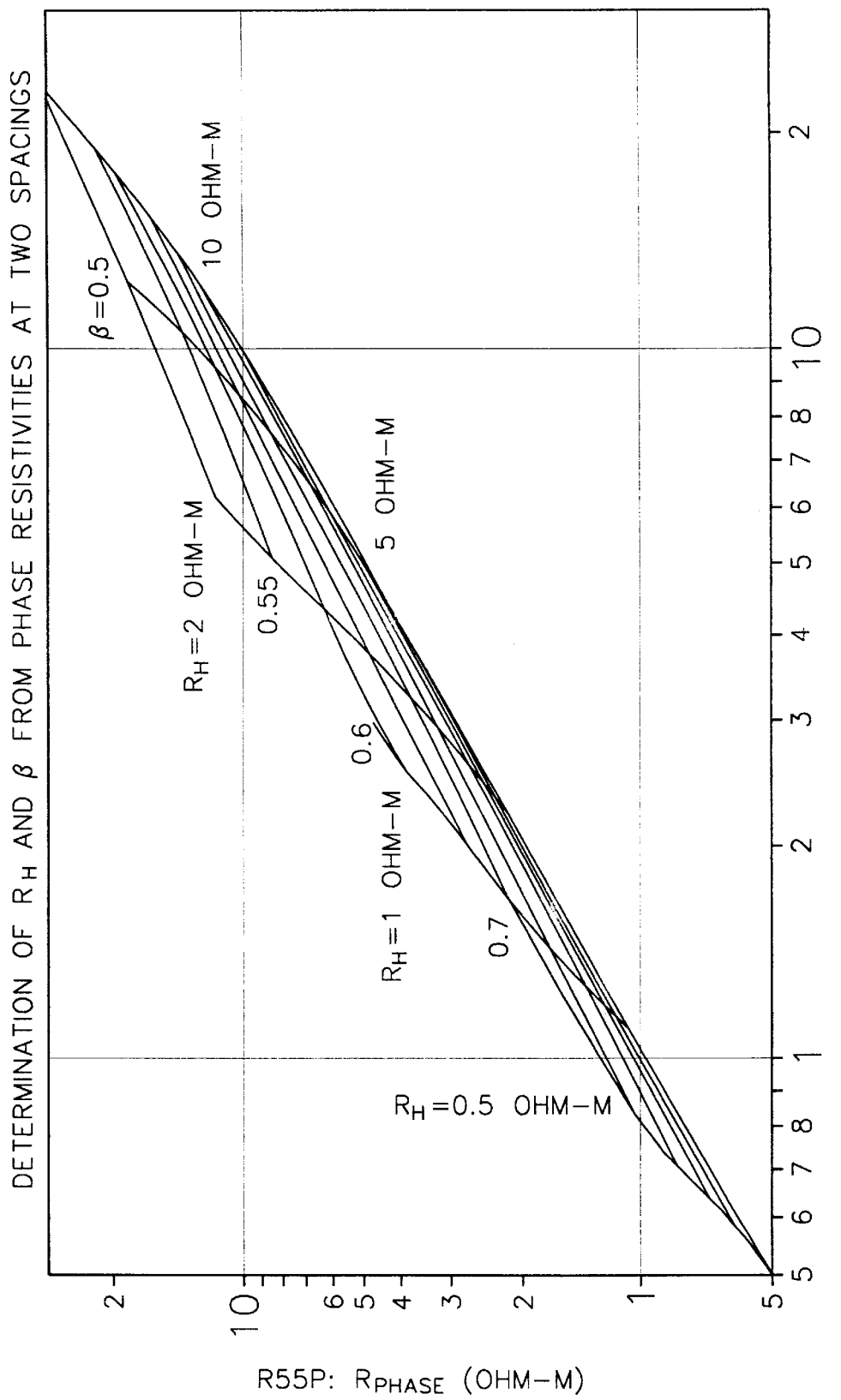
FIG. 8A is a typical graphical illustration of a typical exemplary relationship between a high frequency (2 MHz) phase derived resistivity for a first spacing $R_{55P}$, a phase derived resistivity for a second spacing $R_{25P}$, the formation anisotropy factor $\beta$, and the horizontal resistivity $R_H$.
Figure 9A:
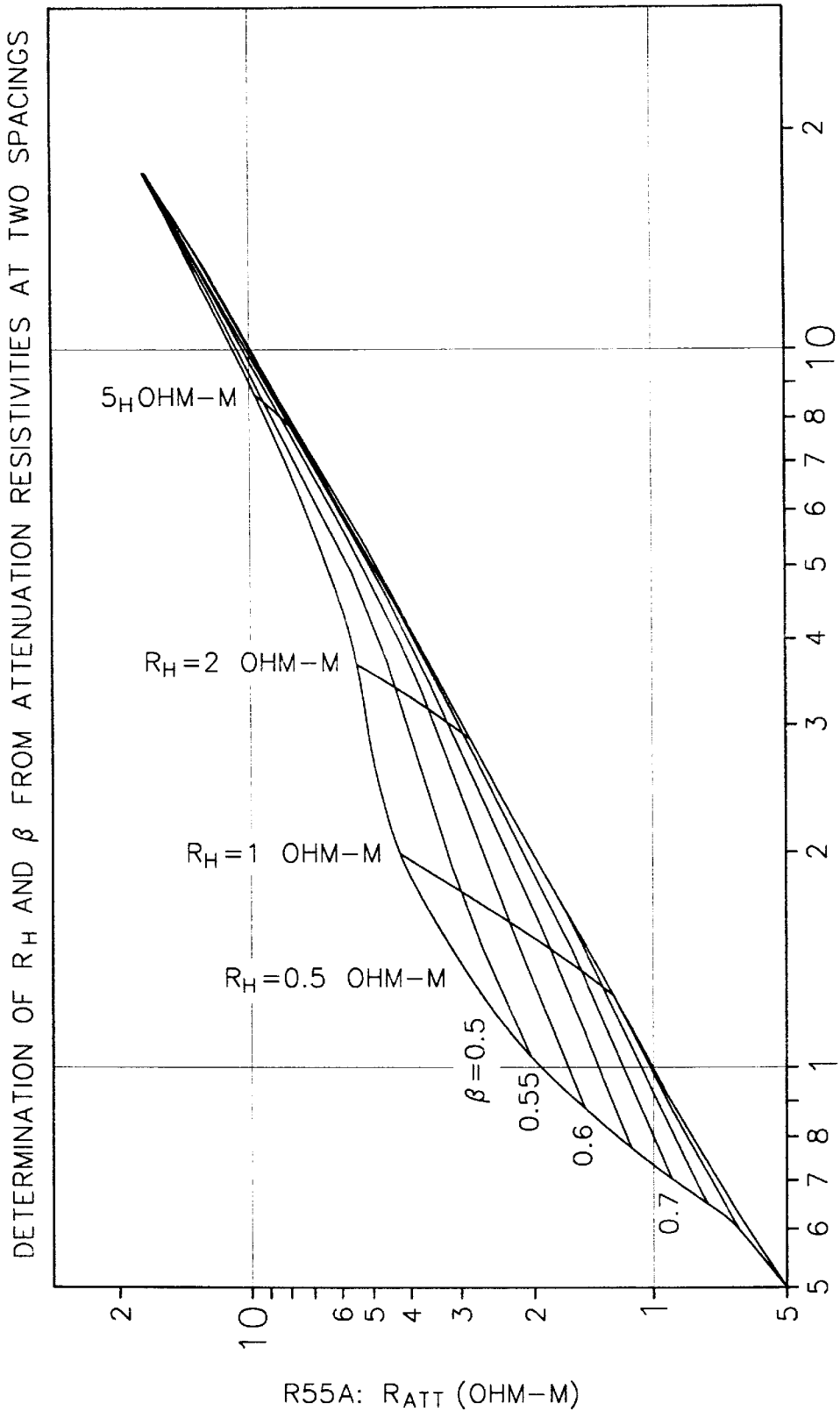
FIG. 9A is a graphical illustration of a typical exemplary relationship between a high frequency (2 MHz) attenuation derived resistivity for a first spacing $R_{25A}$, and an attenuation derived resistivity for a second spacing $R_{55A}$, the formation anisotropy factor $\beta$, and the horizontal resistivity $R_H$.
Figure 9B:
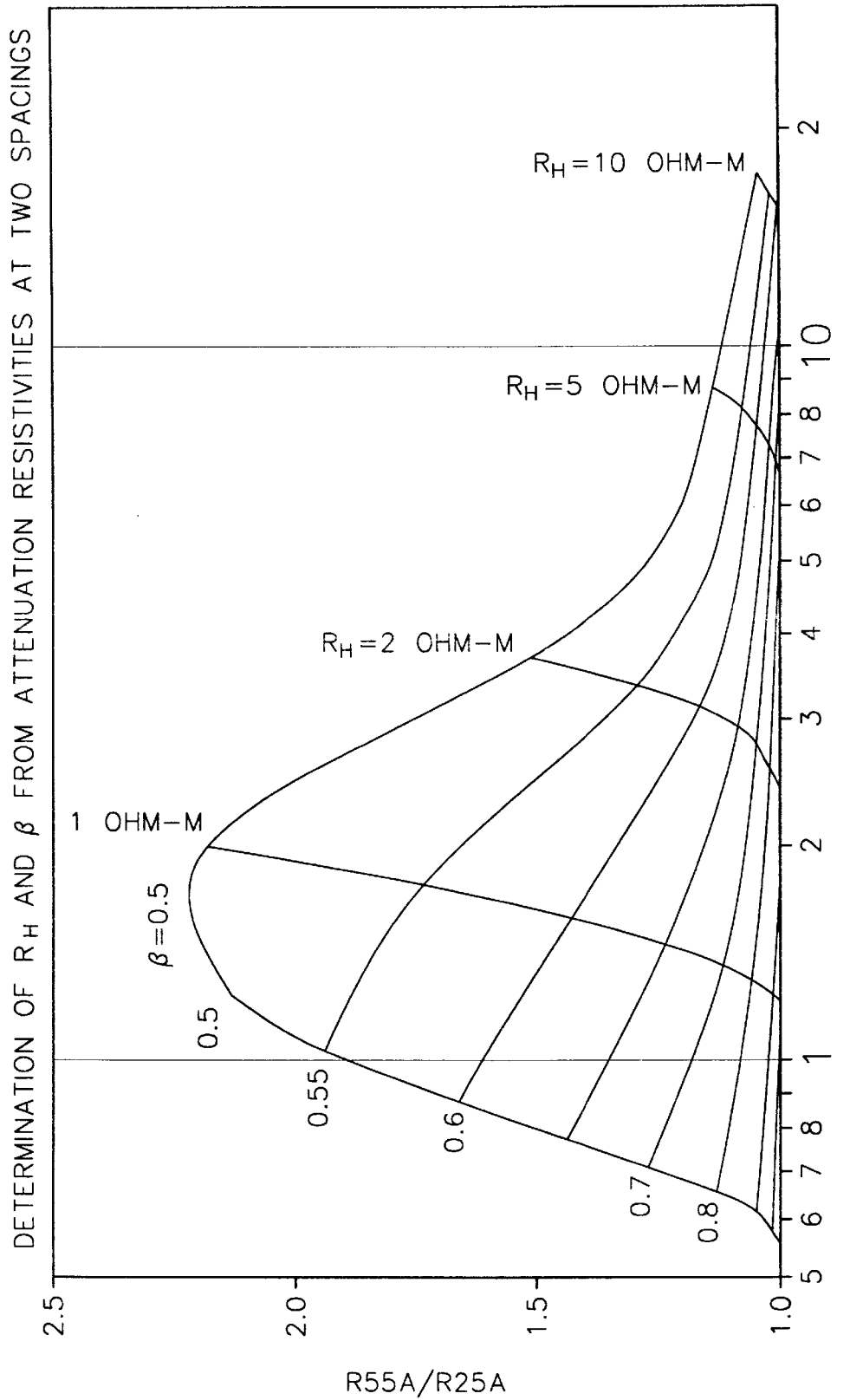
FIG. 9B is a graphical illustration of a typical exemplary relationship between a high frequency (2 MHz) attenuation derived resistivity for a first spacing $R_{25A}$, the ratio between an attenuation derived resistivity for a first spacing $R_{25A}$ and an attenuation derived resistivity for a second spacing $R_{55A}$, the formation anisotropy factor $\beta$, and the horizontal resistivity $R_H$.

In yet another embodiment of the present invention, the horizontal resistivity may be determined using LWD 2 MHz induction type resistivity measurements from two phase derived resistivities based on different spacings ($R_{PL1}$, $R_{PL2}$) or two attenuation derived resistivities from different spacings ($R_{AL1}$, $R_{AL2}$) through simultaneous solution of Equations 2 and 4. The measured phase derived resistivities for different spacings may then be used to determine the horizontal resistivity and formation anisotropy factor β using nomographs or look up tables. FIG. 8A is a nomograph illustrating the relationship between the phase derived resistivity for a first spacing, $R_{55P}$, and the phase derived resistivity for a second spacing $R_{25P}$. The horizontal resistivity $R_H$ and formation anisotropy factor β may be readily determined given the phase derived resistivities for the two different spacings. Similarly, as shown in FIG. 8B, the ratio of the phase derived resistivity for a first spacing and a second spacing $R_{55P}/R_{25P}$, the phase derived resistivity for the second spacing $R_{25P}$ may be used to determine the horizontal resistivity $R_H$ and formation anisotropy factor β. FIG. 9A illustrates how the measured attenuation derived resistivity for a first spacing $R_{55A}$, and the attenuation derived resistivity for a second spacing $R_{25A}$ may be used to determine the horizontal resistivity $R_H$ and formation anisotropy factor β. As shown in FIG. 9B, the ratio of attenuation derived resistivities for first and second spacings $R_{55A}/R_{25A}$, and the attenuation derived resistivity for the second spacing $R_{25A}$ may be used to determine the horizontal resistivity $R_H$ and formation anisotropy factor β. It is understood that while FIGS. 8A, 8B, 9A and 9B illustrate nomographs for particular resistivities and transmitter-antenna spacings, look up tables may similarly be used to determine the horizontal resistivity.

Figure 10A:
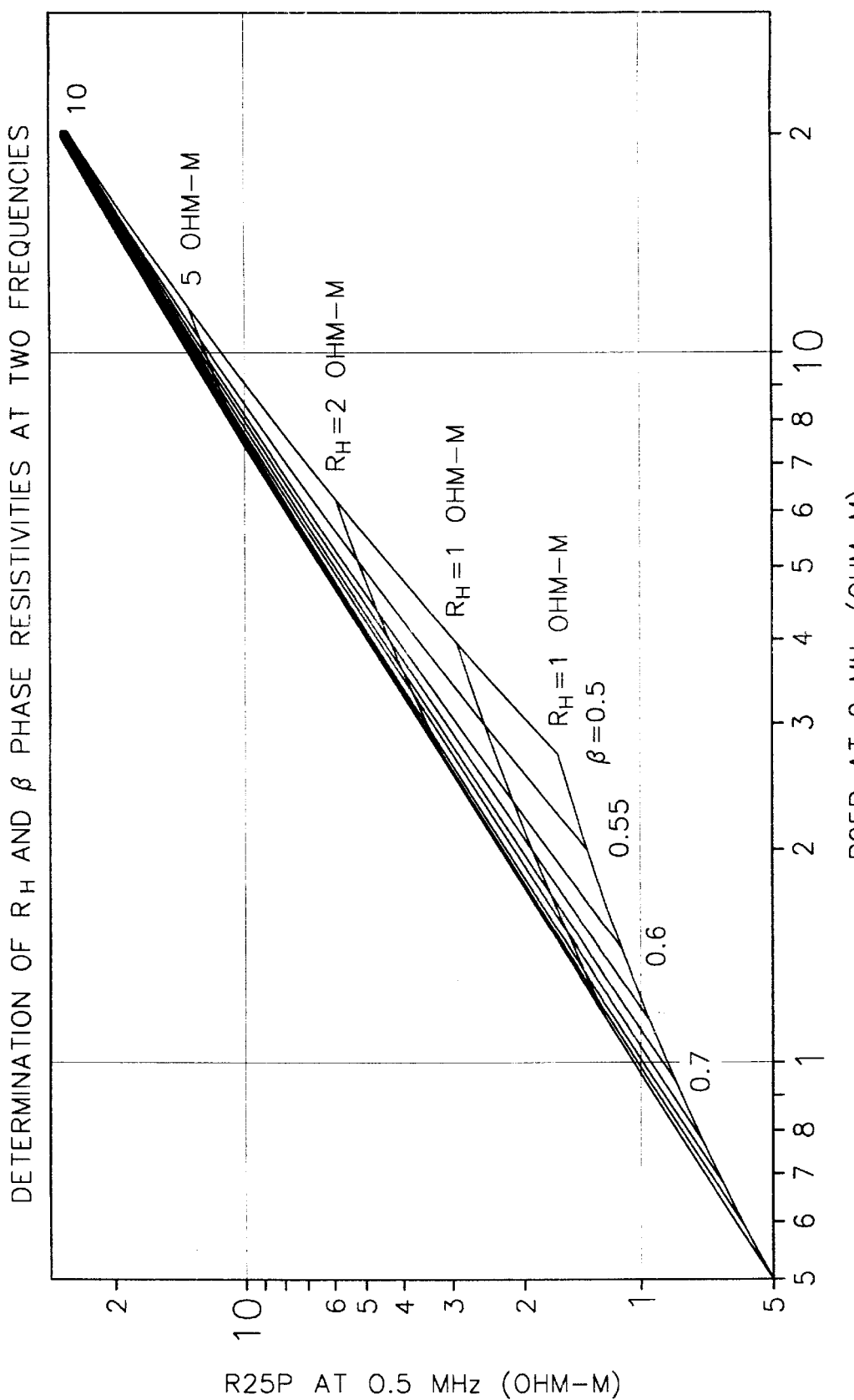
FIG. 10A is a graphical illustration of a typical exemplary relationship between a first high frequency (2 MHz) phase derived resistivity for a first spacing $R_{25P,\omega1}$, the phase derived resistivity for the same spacing at a lower frequency (0.5 MHz) $R_{25P,\omega2}$, the formation anisotropy factor $\beta$, and the horizontal resistivity $R_H$.

In yet another embodiment of the present invention, the horizontal resistivity may be determined using LWD induction type resistivity log measurements for a single spacing at two different frequencies. Given the phase or attenuation resistivities for a known spacing at two different frequencies, the horizontal resistivity formation anisotropy factor β may be readily determined through simultaneous solution of Equations 2 and 4. FIG. 10A is illustrates how the horizontal resistivity $R_H$ and formation anisotropy factor β may readily be determined from a nomograph for a phase resistivity measurement taken at a first spacing at a frequency of 2 MHz ($R_{25P, 2 MHz}$), and a phase resistivity measurement for the same spacing at a frequency of 0.5 MHz ($R_{25P, 0.5 MHz}$). Similarly, FIG. 10B illustrates how the horizontal resistivity $R_H$ and formation anisotropy factor β may be readily determined from a nomograph for a phase resistivity measurement taken at the same spacing at a frequency of 2 MHz ($R_{25P, 2 MHz}$), the ratio of a phase resistivity measurement taken at the same spacing at a frequency of 2 MHz, and a phase resistivity for the same spacing taken at a frequency of 0.5 MHz ($R_{25P, 2 MHz}$). It will be appreciated that similar nomographs or lookup tables may be constructed to permit one skilled in the art to determine the horizontal resistivity $R_H$ from two attenuation derived resistivities for a single spacing at two different frequencies.

Figure 11A:
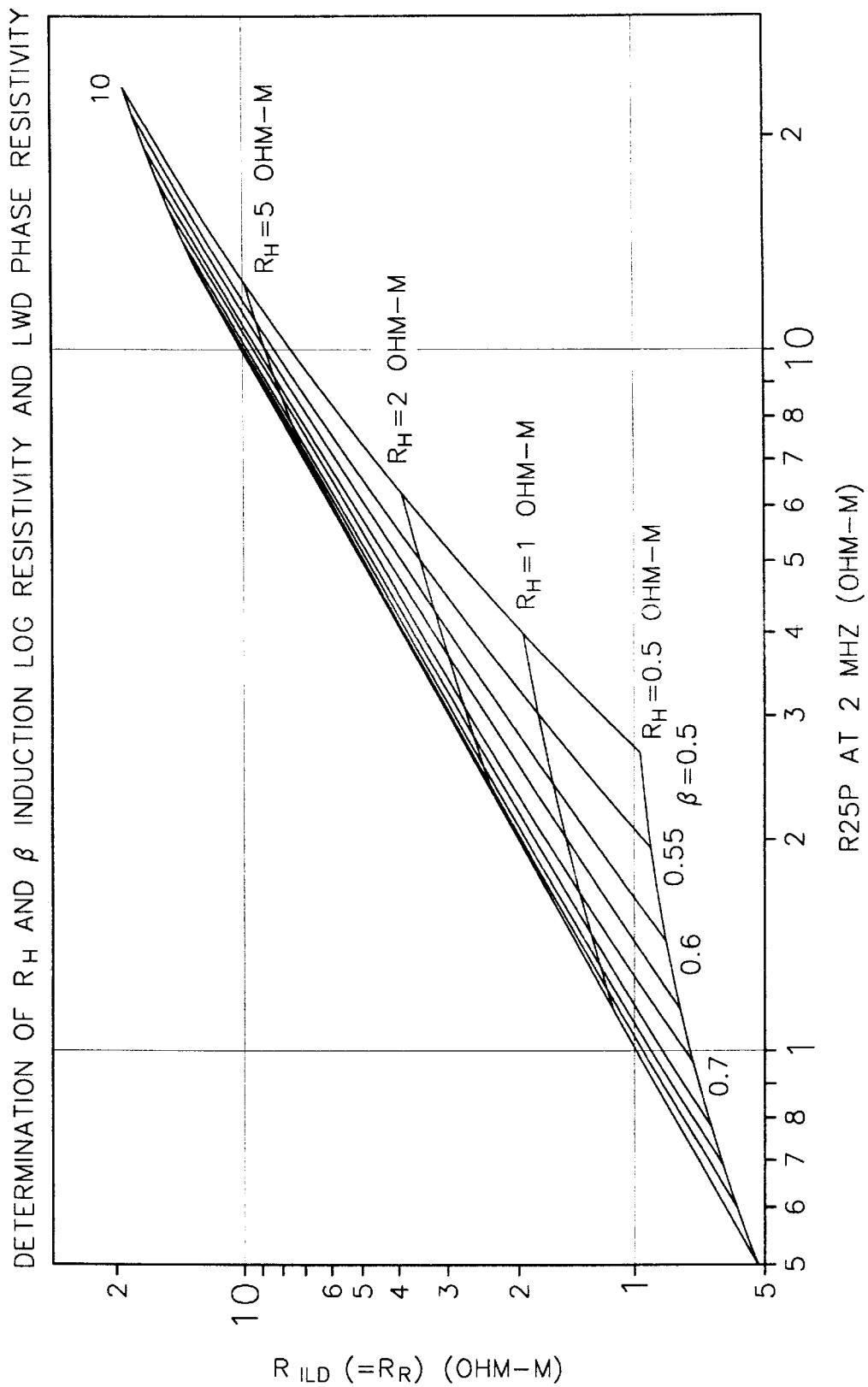
FIG. 11A is a graphical illustration of a typical exemplary relationship between a first high frequency (2 MHz) phase derived resistivity for a first spacing $R_{25P,\omega1}$, the induction R log resistivity at a lower frequency $R_{R,\omega2}$, the formation anisotropy factor $\beta$, and the horizontal resistivity $R_H$.
Figure 11B:
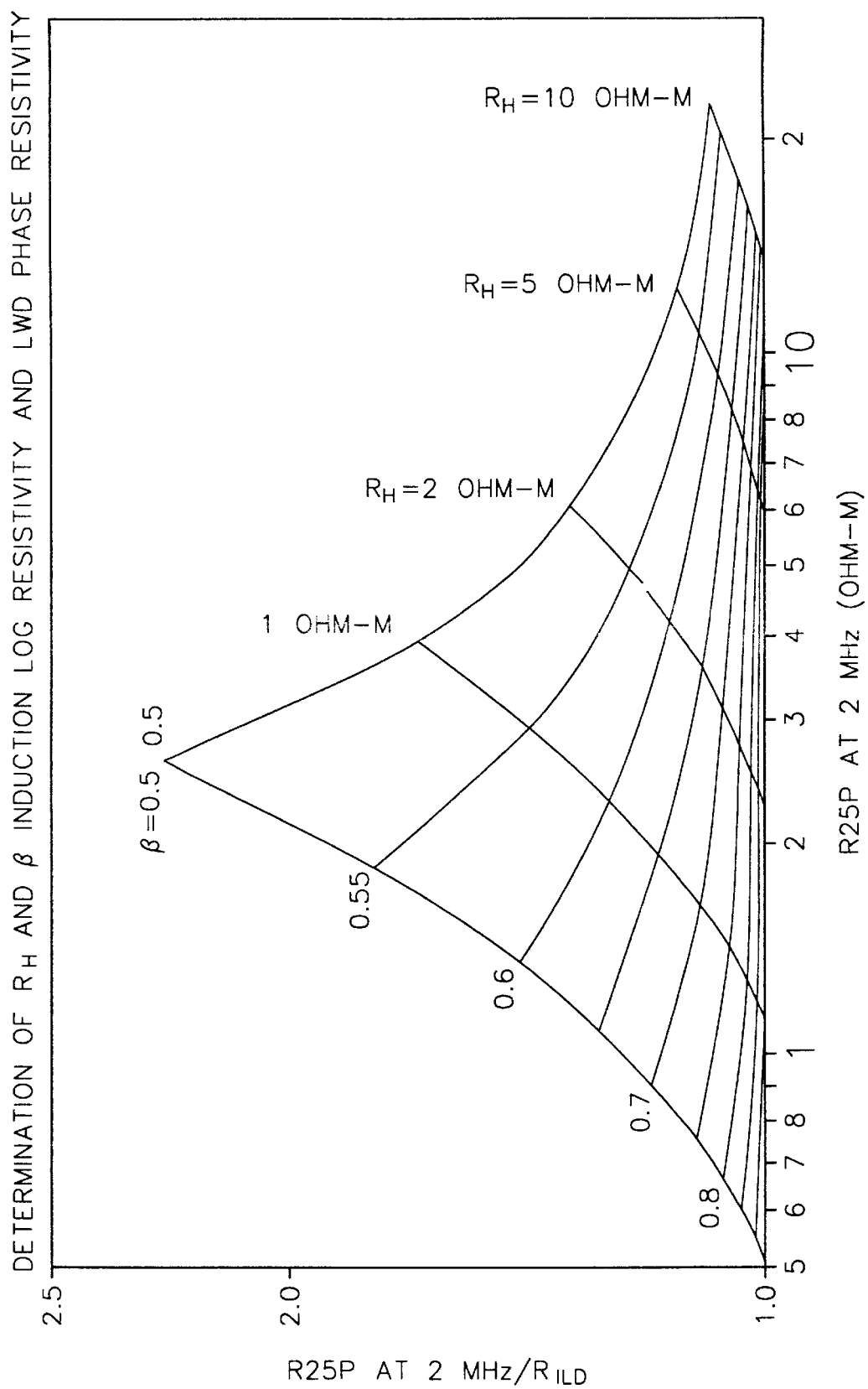
FIG. 11B is a graphical illustration of a typical exemplary relationship between a first high frequency (2 MHz) phase derived resistivity for a first spacing $R_{25P,\omega1}$, the high frequency phase derived resistivity for a first spacing $R_{25P,\omega1}$ the induction R log resistivity at a lower frequency $R_{R,\omega2}$, the formation anisotropy factor $\beta$, and the horizontal resistivity $R_H$.

In yet another embodiment of the present invention, induction log resistivity at a relatively low frequency 20 KHz may be combined with a 2 MHz LWD resistivity to determine the horizontal resistivity $R_H$, through simultaneous solutions of Equations 2 and 4. As shown in FIG. 11A, the horizontal resistivity $R_H$ formation anisotropy factor β may be determined from a nomograph or look up table given the phase resistivity for a 2 MHz LWD tool $R_{25P}$, the induction log R resistivity measurement at 20 KHz. Similarly in FIG. 11B, the horizontal resistivity $R_H$ formation anisotropy factor β may be determined from a nomograph or look up table given the phase resistivity for a 2 MHz LWD tool $R_{25P}$ and the induction log R resistivity measurement. It will be appreciated by those skilled in the art that the horizontal resistivity and formation anisotropy factor β may be readily determined utilizing attenuation derived resistivity as well.

The present invention is applicable to all induction type measurements. The horizontal resistivity and an anisotropy response factor is determined from the two induction type measurements. Where the dip angle is known, the formation anisotropy itself and the vertical resistivity $R_V$ can be readily determined by solving Equation 3.

Although the invention has been described with references to specific embodiments, this description is not meant to be construed in a limiting sense. Various modifications to the disclosed embodiments as well as alternative embodiments of the invention will become apparent to persons skilled in the art upon reference to the description of the invention. It is therefore contemplated that the appended claims will cover any such modifications or embodiments which fall within the true spirit of the invention.

I claim:

1. A method of determining the anisotropic properties of a subterranean formation by means of a propagation logging tool within a borehole penetrating said formation, said tool having operating parameters including an operating frequency ω, at least one transmitter coil and at least two receiver coils, the distance between said transmitter coil and a receiver coil defining a transmitter-receiver spacing, the steps comprising:

deriving a first formation resistivity from a first formation measurement made by said tool wherein said first formation measurement is a phase-shift derived resistivity measurement for a first transmitter-receiver spacing;

deriving a second formation resistivity from a second formation measurement made by said tool, wherein said second formation measurement is a phase-shift derived measurement for a second transmitter-receiver spacing; and determining a horizontal resistivity ($R_H$) and a formation anisotropy response factor for said formation according to a predetermined relationship as a function of said first and second formation derived resistivities.

2. A method of determining the anisotropic properties of a subterranean formation by means of a propagation logging tool within a borehole penetrating said formation, said tool having operating parameters including an operating frequency $\omega$, at least one transmitter coil and at least two receiver coils, the distance between said transmitter coil and said each receiver coil defining a transmitter-receiver spacing, the steps comprising:

deriving a first formation resistivity from a first formation measurement made by said tool wherein said first formation measurement is attenuation derived resistivity measurement for a first transmitter-receiver spacing;

deriving a second formation resistivity from a second formation measurement made by said tool, wherein said second formation measurement is an attenuation derived measurement for a second transmitter-receiver spacing; and determining a horizontal resistivity ($R_H$) and a formation anisotropy response factor.

3. A method of determining the anisotropic properties of a subterranean a formation by means of a propagation logging tool within a borehole penetrating said formation, said tool having at least one transmitter coil and at least one receiver coil, defining a transmitter-receiver spacing, the steps comprising:

deriving a first formation resistivity from a first formation measurement made by said tool, wherein said first formation measurement is a phase-shift derived resistivity made at a first operating frequency $\omega_1$;

deriving a second formation resistivity form a second formation measurement made by said tool, wherein said second formation measurement is a phase-shift derived resistivity made at a second operating frequency $\omega_2$; and determining a horizontal resistivity ($R_H$) and a formation anisotropy factor $\beta$ for said formation according to a predetermined relationship as a function of said first and second formation derived resistivities.

4. A method of determining the anisotropic properties of a subterranean a formation by means of a propagation logging tool within a borehole penetrating said formation, said tool having at least one transmitter coil and at least one receiver coil, defining a transmitter-receiver spacing, the steps comprising:

deriving a first formation resistivity from a first formation measurement made by said tool, wherein said first formation measurement is an attenuation derived resistivity made at a first operating frequency $\omega_1$;

deriving a second formation resistivity form a second formation measurement made by said tool, wherein said second formation measurement is an attenuation derived resistivity made at a second operating frequency $\omega_2$; and determining a horizontal resistivity ($R_H$) and a formation anisotropy factor $\beta$ for said formation according to a predetermined relationship as a function of said first and second formation derived resistivities.

5. A method for determining the anisotropic properties of a subterranean formation by means of an induction logging tool positioned within a borehole penetrating said formation at a dip angle relative to said formation, said tool having operating parameters including an operating frequency $\omega$ and having at least one transmitter coil and at least two receiver coils, the distance between said transmitter and each receiver defining a transmitter-receiver spacing, the steps comprising:

deriving a first formation resistivity from a first formation measurement made by said tool;

changing one of said operating parameters of said tool;

deriving a second formation resistivity from a second formation measurement made by said tool;

determining a horizontal resistivity ($R_H$) and a formation anisotropy response factor $\beta$ for said formation according to a predetermined relationship as a function of said first and second formation derived resistivities.

6. The method of claim 5, wherein the step of changing one of said operating parameters of said tool includes changing the operating frequency of said tool.

7. The method of claim 6, wherein said first derived formation resistivity is an attenuation resistivity measurement at an operating frequency $\omega_1$ and said second derived formation resistivity is an attenuation derived resistivity measurement at an operating frequency $\omega_2$.

8. The method of claim 6, wherein said first derived formation resistivity is a phase-shift resistivity measurement at an operating frequency $\omega_1$ and said second derived formation resistivity is a phase-shift derived resistivity measurement at an operating frequency $\omega_2$.

9. The method of claims 5, wherein the step of changing an operating parameter of said tool includes changing said transmitter-receiver spacing.

10. The method of claim 9, wherein said first derived formation resistivity measurement is an attenuation derived resistivity measurement at a first transmitter-receiver spacing $L_1$ and said second derived formation resistivity measurement is an attenuation derived resistivity measurement at a second transmitter-receiver spacing $L_2$.

11. The method of claim 9, wherein said first derived formation resistivity measurement is a phase-shift derived resistivity measurement at a first transmitter-receiver spacing $L_1$ and said second derived formation resistivity measurement is a phase-shift derived resistivity measurement at a second transmitter-receiver spacing $L_2$.

12. The method of claim 5, further including the steps of:

deriving said dip angle for said borehole; and determining a vertical resistivity $R_V$ for said formation as a function of said horizontal resistivity, said dip angle, and said formation anisotropy response factor.

13. A method of determining the anisotropic properties of a subterranean formation by means of an induction logging tool, said tool having operating parameters including an operating frequency $\omega$ and having at least one transmitter coil and at least two receiver coils, the distance between said transmitter and each receiver defining a transmitter-receiver spacing, the steps comprising:

positioning said tool at a predetermined depth in a first borehole penetrating said formation at a first dip angle $\theta_1$ relative to said formation;

deriving a first formation resistivity from a first formation measurement made with said tool;

repositioning said tool at said predetermined depth in a second borehole penetrating said formation at a second dip angle $\theta_2$ relative to said formation;

deriving a second formation resistivity from said first formation measurement made with said tool;

determining a horizontal resistivity $R_H$ and a formation anisotropy response factor $\beta$ according to a predetermined relationship as a function of said first and second formation derived resistivities.

14. The method of claim 13, wherein said first and second derived formation resistivities are an induction log R ($R_R$) and X ($R_X$) resistivity measurements.

15. The method of claim of claim 13, wherein said first derived formation resistivity is an attenuation derived resistivity and said second derived formation resistivity is a phase-shift derived resistivity.

16. The method of claim 13 wherein said first and second derived formation resistivities are both log R ($R_R$) resistivity measurements.

17. The method of claim 13, wherein said first and second derived formation resistivities are both log X ($R_X$) resistivity measurements.

18. The method of claim 13, wherein said first and second derived formation resistivities are both attenuation derived resistivity measurements.

19. The method of claim 13, wherein said first and second derived formation resistivities are both phase-shift derived resistivity measurements.

* * * * *